Dec. 21, 1965 L. J. ZERBEE 3,224,017
VEHICLE SEAT
Filed Sept. 11, 1963 2 Sheets-Sheet 1

INVENTOR.
LOUIS J. ZERBEE
BY
Dybvig and Dybvig
HIS ATTORNEYS

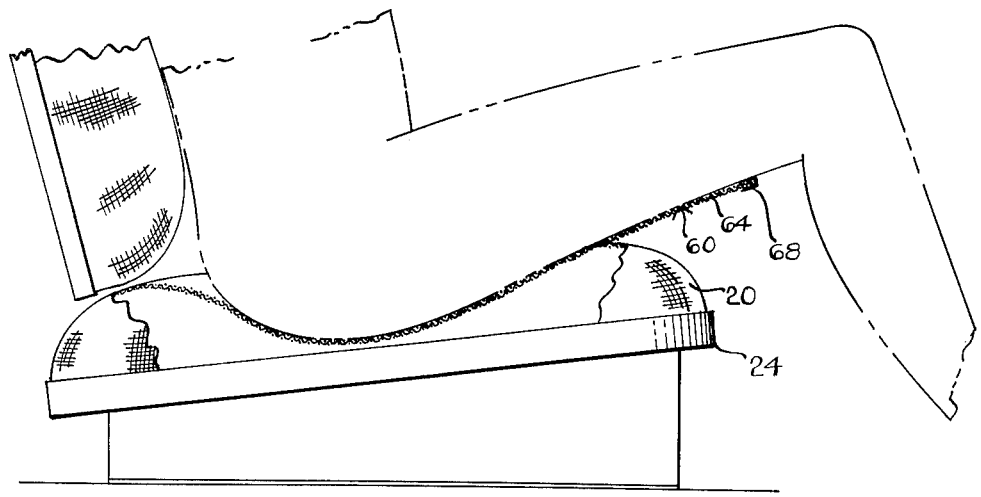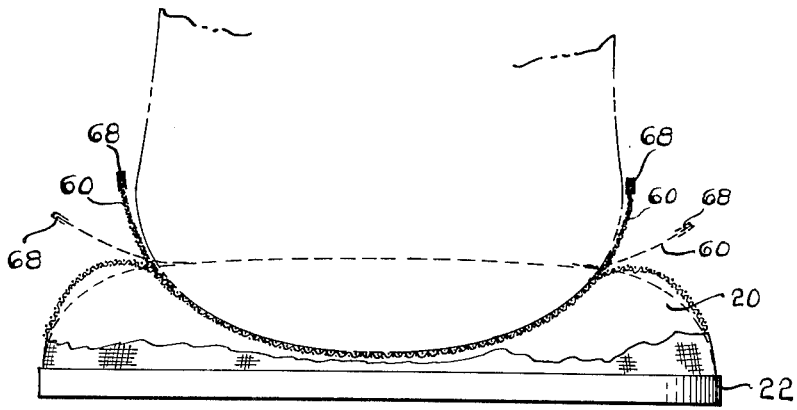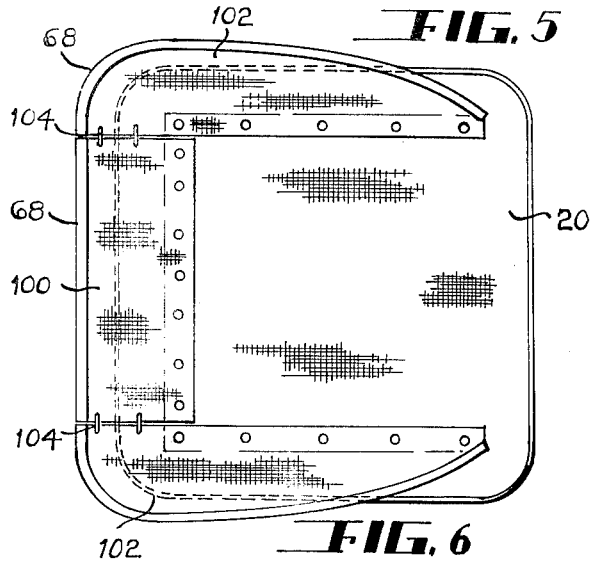

United States Patent Office 3,224,017
Patented Dec. 21, 1965

3,224,017
VEHICLE SEAT
Louis J. Zerbee, 301 Chillicothe Ave., Bellefontaine, Ohio
Filed Sept. 11, 1963, Ser. No. 308,249
7 Claims. (Cl. 5—351)

This invention relates to a seat wherein the foundation, so to speak, of the seat consists of woven wire, which seat is adapted for use in vehicles on land, in the air, or on water, and more particularly to a bucket type seat, although not necessarily so limited, neither as to type nor as to use.

This invention is an improvement upon the seat disclosed in my copending application Serial No. 251,336 filed January 14, 1963 for Reinforced Woven Wire Screen Seat.

Bucket type seats are becoming almost a "must" with the rapidly increasing speeds of motor vehicles. The bucket type seat should have at least two semi-rigid sides to arrest lateral slip or sliding of the occupant. It should have more than normal central firm penetration, to arrest forward movement of the occupant in the case of a sudden stop. This is true even though a seat belt is used.

In connection with the automobile trade, today's buyers demand all of the above safety factors and, in addition thereto, a cushion with the forward margin, particularly, having a soft feeling to the hand, as though the forward portion of the cushion were made from down. The occupant usually does not notice the comparatively rigid sides of a bucket seat, each when getting into or out of the seat. On the other hand, he wishes to feel the security of such a seat support. As is well known, seat belts will arrest lateral motion of the body, whereas a bucket type seat, having comparatively rigid sides, deters the initial movement of the body.

Woven spring wire seats have proven their comfort and endurance for many types of service. However, their shape and the feeling by the hand do not meet demands for a luxurious type of seat as desired by automobile buyers, particularly women buyers. These woven spring wire seats of the prior art, when used as seats for furniture of conventional height, give adequate support for the upper leg area, while in the new type automobiles the seat spring assembly supporting the occupant is built in a more or less wedge shape, with the front edge quite yieldable. This has been accomplished by using adequate amounts of sponge, hair, cotton or similar materials. While such construction, when new, meets the demands of the automobile purchasing public, such a seat has a tendency to deteriorate, lose its shape, the padding slipping out of place forming bumps, et cetera.

An object of this invention is to provide a bucket type seat using a woven spring wire base provided with a forward edge that is very soft and easily yieldable and which has the appearance of the conventional automobile seat. This has been accomplished by utilizing a substantially U-shaped steel wire member attached to the main body of the woven spring wire and padded by a suitable cushioning material. By attaching the inner edge of the U-shaped member to the main body, the outer edge is very flexible. For example, if the spring wire is covered with sponge rubber, it results in a very yieldable, soft, downy-like forward edge of the seat.

It is another object of this invention to provide a screen wire seat wherein the dimensions are such that the seats may be used in automobiles and other motor vehicles and wherein the seats have the desired riding qualities and durability. This has been accomplished by providing an underlying reinforcing member of steel wire that has essentially the same physical characteristics as the seat proper, the reinforcing member extending along both sides and across the rear portion of the seat, so as to form a continuous reinforcing member which will underlie the bony structure in the lower torso, except the terminal of the spinal system, and thereby support the weight of the torso and upper legs, the center portion of the seat and the forward portion of the seat being without reinforcement. In order to provide the desired soft cushiony forward edge of the seat, a substantially U-shaped screen member, having the outer side margins flared upwardly, is attached by suitable fastening members to the main body portion of the screen wire member.

Another object of this invention is to provide a bucket type seat that will so cradle the occupant that he sits in the seat, rather than on it, the lower parts of the torso being nested securely, as much as four inches below the top surface of the cushion, thus keeping him from sliding forward due to sudden stops or sideways on fast turns.

Other objects and advantages reside in the construction of parts, the combination thereof, the method of manufacture and the mode of operation, as will become more apparent from the following description.

In the drawings,

FIGURE 4 is a fragmentary cross sectional view of a seat that is mounted in an inclined position without the use of a topper pad and upholstering, showing the contour of the seat when occupied.

FIGURE 5 is another fragmentary cross sectional view of a seat without the use of a topper pad and upholstering, showing the contour of the seat when in use.

FIGURE 6 is a top plan view of a modified screen wire seat without the padding in position.

Figure 1:
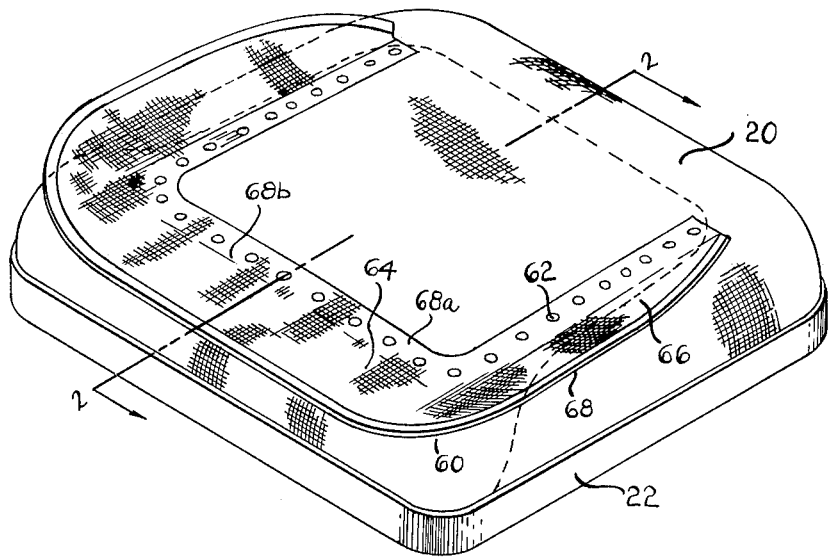
FIGURE 1 is a perspective view of the wire screen seat without the upholstering and without the foam rubber or plastic material.

Referring to the drawings, the reference numeral 20 indicates the main body screen member or seat having the margins clamped between a pair of steel bands 22 and 24 extending throughout the entire periphery of the seat 20. This seat consists of a woven wire screen utilizing resilient wire, such as high carbon steel wire. There may be eight wires to the inch. This structure is substantially the same as that disclosed in my United States Letters Patent No. 2,126,439 issued August 9, 1938 for Spring Assembly. However, instead of the reinforcing members as used in this patent, a reinforcing member 30 extends along the sides and across the entire rear of the seat, this reinforcing member 30 having its margins also clamped between the bands 22 and 24 along the sides and across the entire rear of the seat, as fully described in my copending application Serial No. 251,336. The margins of the seat 20 and the reinforcing member 30 are clamped between the bands 22 and 24 by bolts or rivets or by welds.

As clearly seen in the drawings, the unsupported margin of member 30 extends along an arcuate line starting near the front of the sides of the seat and progressively curving away from the front of the seat, so as to leave a comparatively narrow margin near the center 32 of the rear of the seat. This curvature 30–a extends progressively inwardly and rearwardly from the forward portion of the seat 20 towards the rear of the seat; but spaced from the extreme rear of the seat. The mesh of the seat 20 and that of the reinforcing member 30 may be the same size. However, due to the curvature of the reinforcing member, particularly that of the sides, the mesh of the seat 20 and that of the reinforcing member 30 may register in certain areas and be completely out of registry in other areas, which has been more fully shown and described in my copending application Serial No. 251,336. This phenomenon permits automatic distribution of the load for various road conditions and passenger weights.

Instead of using the woven wire screen reinforcing member 30 for reinforcing the under side of the screen forming the main body of the seat 20, any other suitable resilient means may be used, as for example, an underlying rubber member having substantially the same elasticity or flexibility as the underlying screen reinforcing member.

In order to meet the exacting demands of some of the buyers, as for example, buyers for the automobile industry, the airplane industry, theater industry, et cetera, it may be desirable to have a soft, flexible edge, especially on the forward portion of the seat, so that an occupant laying his hand on the edge of the seat will feel the soft elasticity of the underlying portion, similar to the feel of a cushion made of down.

A screen member 60, substantially U-shaped, as clearly shown in FIGURE 1, is fastened to the underlying screen member 20 by suitable fastening means, such as rivets 62, staples or any other suitable fastening means. In FIGURE 1, this U-shaped member has been shown as a unitary screen member. However, it need not be a single member extending continuously along the sides and the forward portion of the seat, in that incisions could be cut so as to extend between the forwardly directed portion and the two side portions. The U-shaped member, as clearly shown in FIGURE 6, may consist of three pieces, namely, the center portion 100, fastened to the top of the main body screen member 20, and the two side portions 102, having the inner margins fastened to the top of the main body member 20. The sides 102 project outwardly, as shown in dash lines in FIGURE 5, and flare upwardly. The forward portions of the side portions 102 and the center portion 100 may be secured together by loosely mounted links 104 simulating conventional hog rings.

Figure 2:
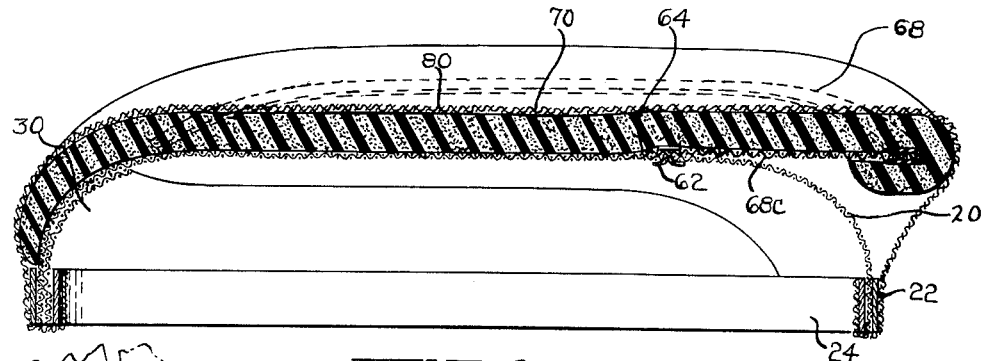
FIGURE 2 is a cross sectional view of the seat shown in FIGURE 1, with the upholstering material and the foam rubber overlying the cushioning material.
Figure 3:
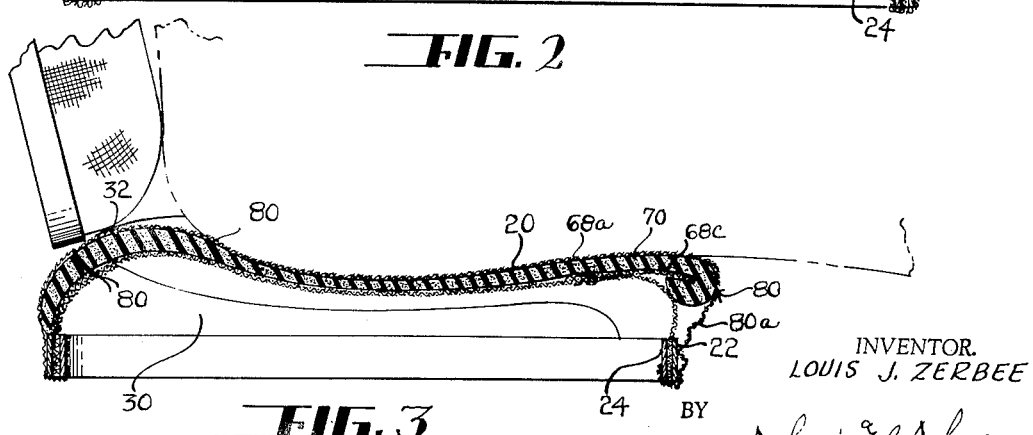
FIGURE 3 is another cross sectional view, showing the shape of the seat when occupied.

Referring to the preferred embodiment disclosed in FIGURES 1 to 3, the horizontal portion 64 extends forwardly from the main body screen member 20 and the sides 66 are flared upwardly when the seat is not occupied, as clearly shown in FIGURE 5.

Referring to FIGURE 5 showing the rear view of the seat as it appears when it is occupied, it can readily be seen that the sides 66 move upwardly and move into contact with the sides of the occupant of the seat, that is, these sides will move from the dotted position shown in FIGURE 5 into the full line position. Obviously, if it is a small, light weight person occuping the seat, the sides will be raised less and may not contact the sides of the occupant of the seat.

The unsupported margins of the U-shaped member are enclosed by a continuous flexible member 68 or a metallic U-shaped member scored or notched, so as to provide the necessary flexibility to permit the side portions to move upwardly and inwardly when the seat is occupied and to permit the forward portion to be deflected downwardly into contact with the under side of the legs of the occupant. This flexible member 68 isolates the ends of the wire from the topper pad 70. This topper pad may consist of any suitable resilient material, such as foam rubber, foam plastic, or it may consist of felt, kapok or any other suitable cushioning material. Furthermore, the seat may be upholstered.

The seat portion, consisting of the main body screen member 20, the bands 22 and 24, the underlying reinforcing member 30 and the U-shaped member 60 or the members 100, 102 and 104 may be manufactured and assembled by a manufacturer supplying the seats to the various automobile manufacturers or to upholsterers. The automobile manufacturers or upholsterers could then provide the topping pad and the upholstering material 80 that may be selected.

When these seats are used in automobiles, the bands 22 and 24, that is, the main supporting members for the wire screen member, may be inclined, as clearly shown in FIGURE 4, so that the leading forward edge is on a much higher level than the rear portion.

Member 60 may be used for certain types of seats, as for example, theater seats, furniture seats, et cetera, without the underlying reinforcing member 30.

Obviously, for many types of furniture, it would be desirable to provide a cushion that is not a bucket type, in other words, one that approaches a pillow type seat. If a seat other than a bucket type seat is desired, the sides 102, shown in FIGURE 6, could be omitted and member 100 would then provide a soft, downy-like forward edge.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A woven wire screen type seat having an arcuate resilient main screen member, wherein the margins are directed downwardly and held in position, said seat being characterized by a U-shaped resilient screen member having the inner margin fastened to the top of the arcuate resilient screen member, the U-shaped member having the margins extending outwardly and the side margins flaring upwardly, the legs of the U-shaped member extending along the sides of the arcuate seat member and the bight of the U-shaped member overlying the forward edge of the main screen member to provide a flexible leading portion of the seat.

2. A woven wire screen type seat according to claim 1, wherein the margin of the outwardly extending U-shaped screen member is enclosed in a flexible means to isolate the ends of the wires.

3. A woven wire screen type seat according to claim 1, wherein the forward margin of the outwardly extending member projects in front of the main screen member.

4. A woven wire screen type seat according to claim 1, wherein the under side of the arcuate screen member is reinforced along the sides and the rear thereof by a U-shaped member snugly seated against the under side thereof, the outer margins of said U-shaped member projecting downwardly, and means for rigidly clamping the downwardly projecting margins to thereby resist flexing of the sides and the rear of the arcuate screen member.

5. A bucket type woven resilient wire screen seat having an arcuate resilient screen main body member having the margins thereof projecting downwardly clamped in position, and a reinforcing screen member underlying the rear portion of the main body member and projecting forwardly along the sides of the main body member so as to retard the flexing of the seat along the sides thereof, said bucket type seat being characterized by a U-shaped resilient screen means having the inner margin fastened to the top of the main body member, with the legs of the U-shaped means extending along the sides of the seat and the bight of said U-shaped means overlying the forward portion of the main body member, the sides of the U-shaped means projecting outwardly and flared upwardly so as to diverge from the main body member when unoccupied to provide flexible sides and forward portion of the seat.

6. A bucket type seat according to claim 5, wherein a resilient topper pad covers the main body of the seat and the U-shaped means.

7. A bucket type seat according to claim 5, wherein a resilient foam plastic member covers the main body of the seat and the U-shaped means and wherein the upholstering material overlies the resilient foam plastic member and the main body.

References Cited by the Examiner
UNITED STATES PATENTS

| | | | |
|---|---|---|---|
| 2,126,439 | 8/1938 | Zerbee | 297—287 |
| 2,278,049 | 3/1942 | Zerbee | 297—420 |
| 2,806,513 | 9/1957 | Zerbee | 5—351 |

FRANK B. SHERRY, *Primary Examiner.*